United States Patent [19]
Schwarz

[11] Patent Number: 5,476,616
[45] Date of Patent: Dec. 19, 1995

[54] APPARATUS AND PROCESS FOR UNIFORMLY MELT-BLOWING A FIBERFORMING THERMOPLASTIC POLYMER IN A SPINNERETTE ASSEMBLY OF MULTIPLE ROWS OF SPINNING ORIFICES

[76] Inventor: Eckhard C. A. Schwarz, P.O. Box 512, Neenah, Wis. 54957-0512

[21] Appl. No.: 354,432

[22] Filed: Dec. 12, 1994

[51] Int. Cl.[6] ..................................... B29C 47/30
[52] U.S. Cl. .................... 264/6; 264/12; 425/7; 425/72.2; 156/167
[58] Field of Search .................. 264/6, 12; 425/7, 425/72.2; 156/167

[56] References Cited

U.S. PATENT DOCUMENTS 4,380,570  4/1983  Schwarz ................................. 428/296
5,122,048  6/1992  Deeds ............................... 425/174.8 E
5,165,940  11/1992  Windley ................................ 425/72.2
5,405,559  4/1995  Shambaugh ................................ 264/6

Primary Examiner—Mary Lynn Theisen
Attorney, Agent, or Firm—Eckhard C. A. Schwarz

[57] ABSTRACT

There is disclosed a novel apparatus and process for melt-blowing fiberforming thermoplastic polymers to form fine fibers by extruding through spinning nozzles arranged in four or more rows. The molten fibers are accelerated to near sonic velocity by gas being blown in parallel flow through small circular gas orifices surrounding each nozzle. The air orifices are formed by a family of plates which effect the perfect centering of each nozzle in each of the circular air orifices.

5 Claims, 5 Drawing Sheets

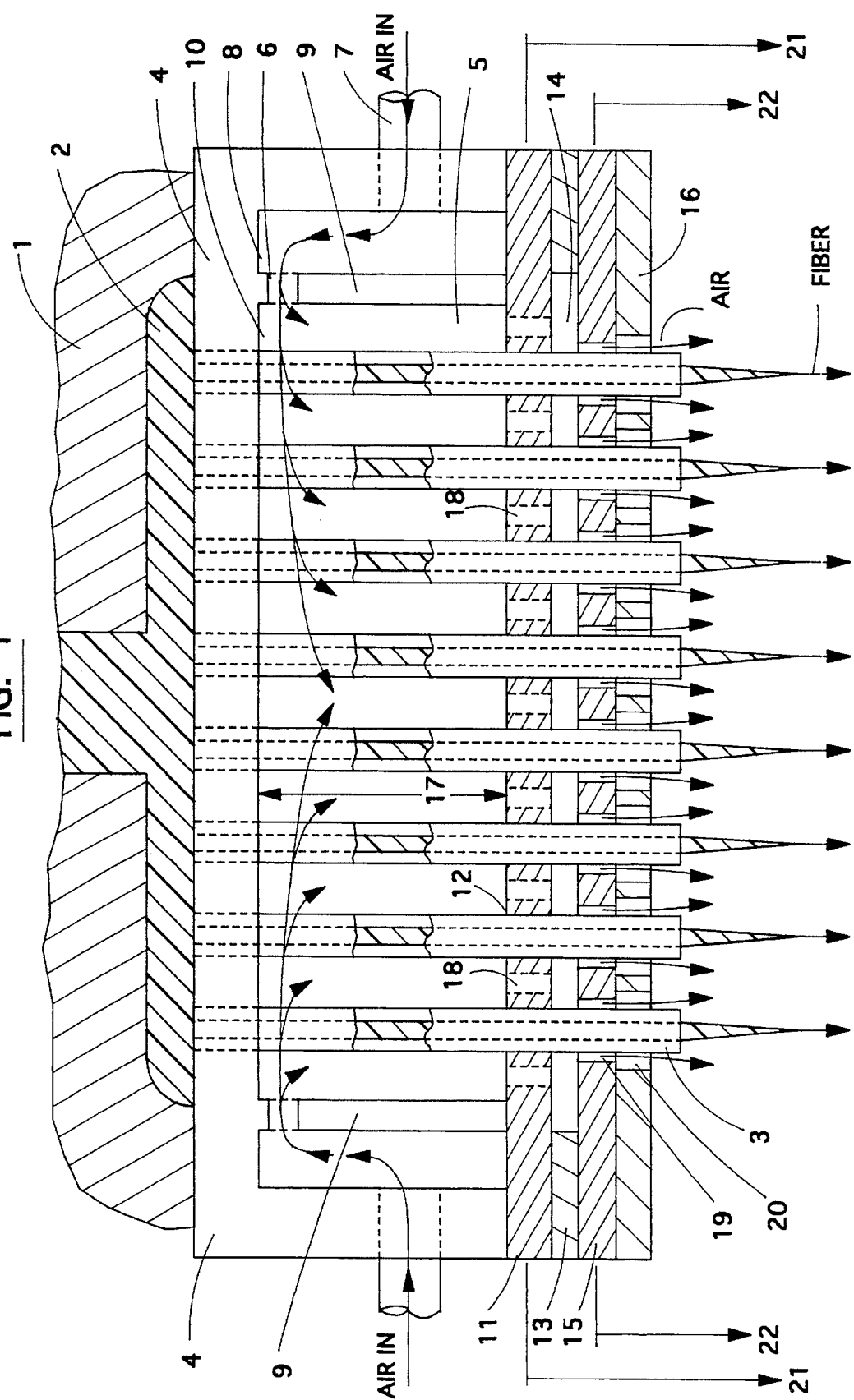

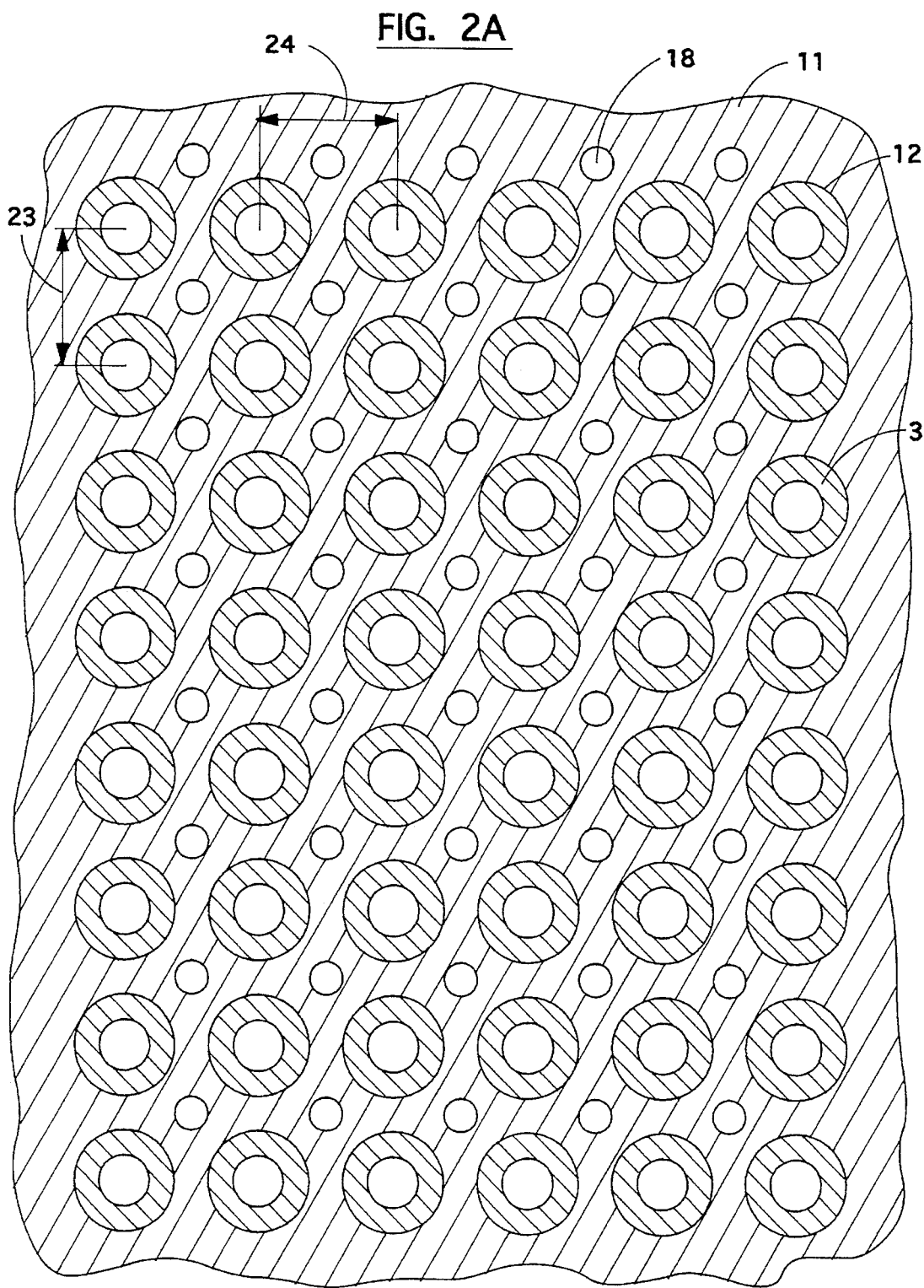

APPARATUS AND PROCESS FOR UNIFORMLY MELT-BLOWING A FIBERFORMING THERMOPLASTIC POLYMER IN A SPINNERETTE ASSEMBLY OF MULTIPLE ROWS OF SPINNING ORIFICES

BACKGROUND OF THE INVENTION

This invention relates to improvements of melt-blowing processes applying multiple rows of spinning orifices described in U.S. Pat. No. 4,380,570, which is herewith incorporated by reference. More particularly, it relates to the improvement whereby the number of rows of spinning orifices can be extended beyond the number possible before and still maintain fiberforming spinning quality without the formation of "shot", thus improving the productivity of a spinning unit.

Objects of the Invention

It is an object of the present invention to increase the productivity of a melt-blowing spinnerette of multiple rows of spinning orifices by uniformly directing streams of gas to each row of spinning orifices.

Another object of the invention is to provide a uniform stream of attenuating gas around each spinning nozzle by centering the nozzles in round holes of gas cover plates to achieve an even gas flow around the circumference of each nozzle.

Summary of the Invention

These and other objects of the invention are achieved by directing a gas flow to the base of the spinning nozzles by means of baffle plates, and extending the length of the spinning nozzles. The spinning nozzles are guided through a family of gas cover plates providing for the centering of the round spinning nozzles through round gas supply holes and supplying a uniform stream of gas to each nozzle and row of nozzles.

BRIEF DESCRIPTION OF THE DRAWINGS

A better understanding of the present invention as well as other objects and advantages thereof will become apparent upon consideration of the detailed disclosure thereof, especially when taken with the accompanying drawings, wherein like numerals designate like parts throughout; and wherein FIG. 1 is a partially schematic side view of a spinnerette assembly of the present invention, showing the path of gas and polymer flow;

DETAILED DESCRIPTION OF THE INVENTION

It has been found in previous melt-blowing assemblies such as described in U.S. Pat. No. 4,380,570 that centering of spinning nozzles in a gas stream is essential for good quality fiber formation. Therefore nozzles were directed through square or triangular holes or screens to assure centering. It was recognized that round holes were preferred, but it was difficult to center the spinning nozzles because of easy bending of the nozzles, if the nozzle length was more than a certain length. It was further recognized that, in order to achieve uniform spinning in an assembly of more than four rows of spinning nozzles, the length of the nozzles had to be increased to about six times of the nozzle diameter, and the gas stream had to be directed to the base of the nozzles 3 in the gas cavity 5. It was further recognized that in order to achieve uniform and high quality fiber formation, the spinning nozzles and rows of spinning nozzles had to be separated by a minimum distance so that the fiber attenuating gas stream of a nozzle did not interfer with its neighbouring gas stream from another nozzle.

Figure 2B:
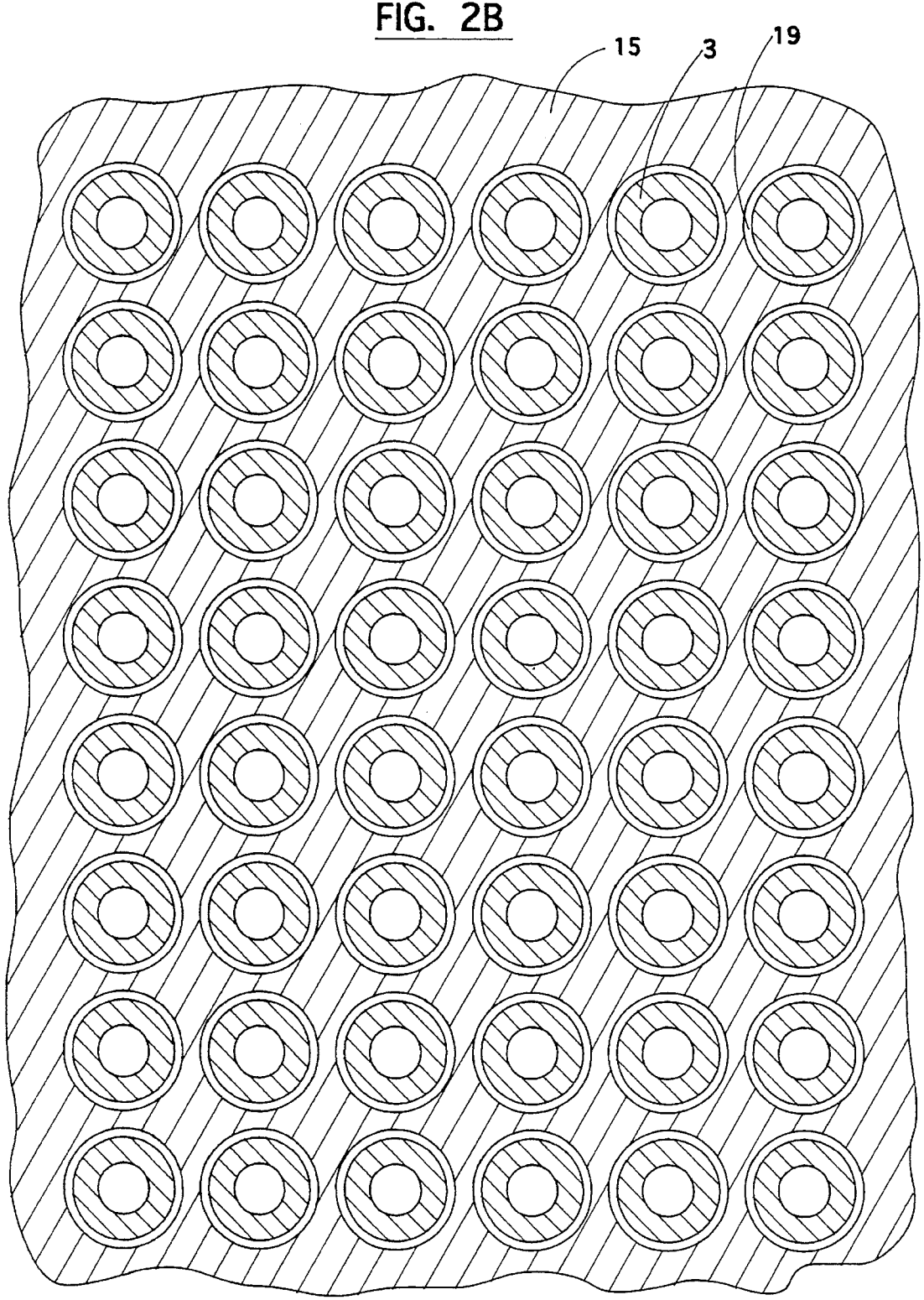
FIG. 2 is a partial bottom view of the spinning nozzles and family of gas cover plates, taken along the line 21—21 22—22 of FIG. 1.
Figure 3:
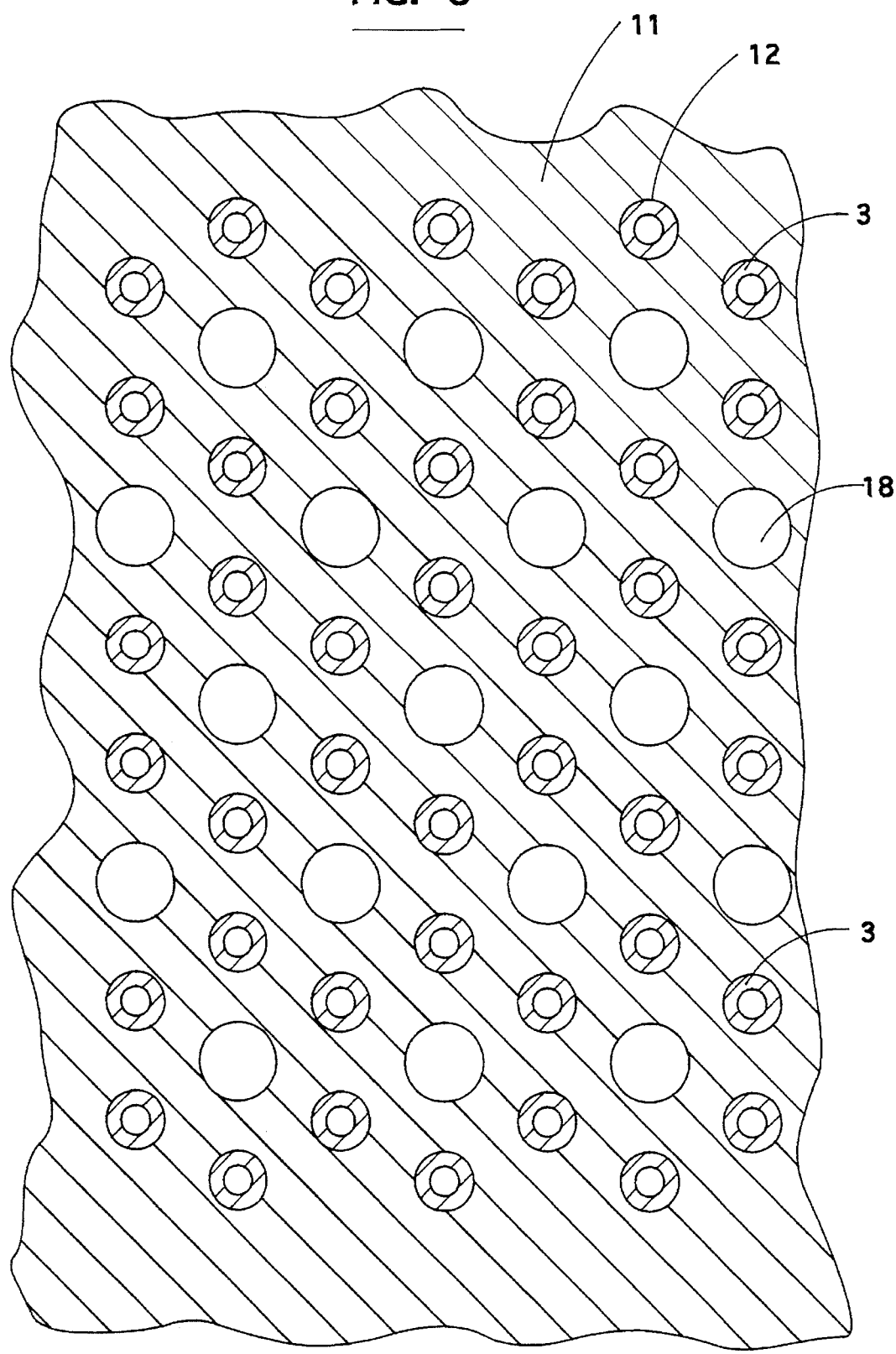
FIG. 3 shows a schematic bottom view of a spinnerette assembly using a hexagonally spaced nozzle pattern and gas hole pattern.
Figure 4:
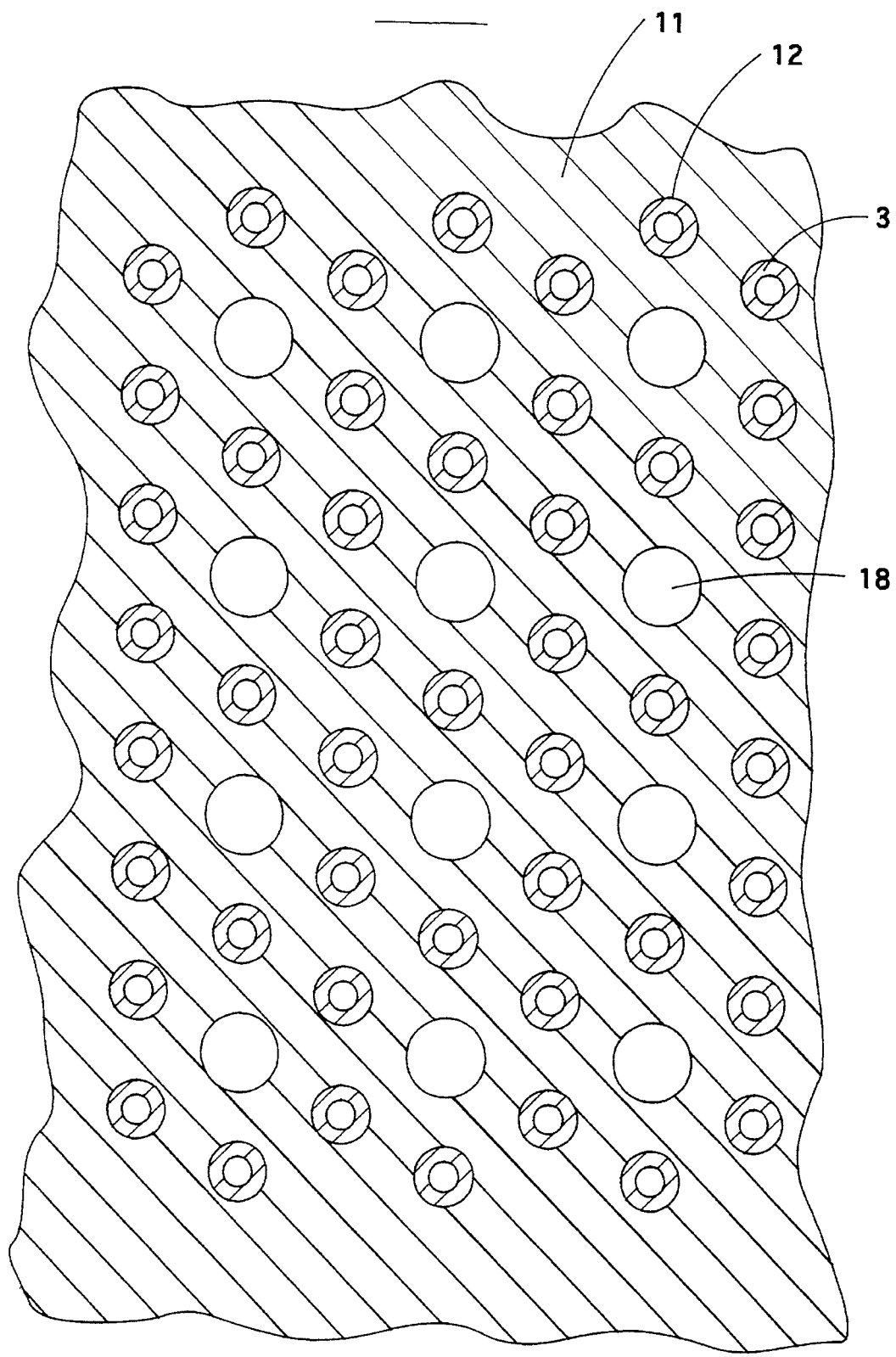
FIG. 4 is another cshematic bottom view of a spinnerette using a different hexagonally spaced nozzle and air hole pattern.

Referring now to FIG. 1, the spinnerette assembly is mounted on the die body 1 which supplies polymer melt to a supply cavity 2 feeding the spinning nozzles 3 which are mounted in the spinnerette body plate wherein nozzles 3 are spaced from each other at a distance of at least 1.3 times the outside diameter of a nozzle 3. The nozzles 3 lead through the gas cavity 5, which is fed with gas, air or other suitable fluids from the gas inlet slot 6. The primary supply gas enters the spinnerette assembly through pipe 7 into the supply cavity 8 which is in the form of a first gas cavity having a height of at least six times the outside diameter of a nozzle 3. The baffle plate 9 diverts the gas stream and forces the gas through the slot 6 toward the base of the nozzles 10. The nozzles 3 protude through gas cover plate 11 through tight fitting holes 12 arranged in the same pattern as the nozzle mounts in spinnerette body plate 4. The gas cover plate family further consists of spacer plate 13 which forms a second gas cavity 14 between plate 11 and 15 said second gas cavity having a height of at least one half of the diameter of a nozzle 3 and wherein first gas plate 11, spacer plate 13, and second gas plate 15 have a total combined thickness of less than ten times the outside diameter of a nozzle 3. Another gas cover plate 16 is sometimes added to the assembly to facilitate expansion of the gas to attenuate the fibers exiting the nozzles 3. The complete path of the gas is now from inlet pipe 7 into the gas supply cavity 8 through inlet slot 6 into the gas cavity 5 which has a specific height of 17. The gas then flows through gas holes 18 of plate 11 into the gas cavity 14 and then around the nozzles 3 through holes 19 and 20, in which the nozzles 3 are centered. The gas inlet slot 6 can be replaced by a series of holes having a similar total cross sectional opening as the slot they replace. FIGS. 2A and B show the bottom view of plates 11 and 15, respectively. FIGS. 3 and 4 show gas cover plate 11 with different types of hexagonal geometries, where each nozzle hole 12 is always the same distance from a gas hole 18.

The following examples are included for the purpose of illustrating the invention and it is to be understood that the scope of the invention is not to be limited thereby. For examples 1 through 11, 5" long spinnerettes were used, of the type shown in FIG. 1 and 2. The height 17 of the gas cavity 5 was varied in these spinnerettes as well as the center to center nozzle distance 23 and 24. The baffle 9 in Example 5 was removed to show the baffle effect. The gas slot 6 at the base of the 9 was 0.050" high. Table 1 shows the results of the examples 1 to 11. Polypropylene of MFR (Melt Flow Rate, as determined by ASTM-method D-1238-65T) 70 (HIMONT "HH442") was used in these experiments. Molten polypropylene was fed from a 1" extruder at 500° F. to the die block cavity 2.

DISCUSSION OF EXAMPLES 1 THROUGH 11

Examples 1 to 11 demonstrate the significance of different variables in the spinnerette design.

In Example 1 only the outer 2 rows of nozzles 3 spun fibers evenly, the inner rows formed droplets intermittantly which resulted in "shot" in the collected fiber web.

In Example 2 the height of the gas cavity 17 was increased from 0.4 to 0.6 inches, and the droplets almost disappeared, disappearing completely in Examples 3 and 4, where a cavity 17 height of 0.8 and 1.0 inches was used. The fibers formed had a diameter of about 5 to 10 micrometers.

TABLE 1

| EXAMPLE: | 1 | 2 | 3 | 4 | 5 | 6 | 7 | 8 | 9 | 10 | 11 |
|---|---|---|---|---|---|---|---|---|---|---|---|
| Nozzle 3, outside diameter (inch) | 0.032 | 0.032 | 0.032 | 0.032 | 0.032 | 0.032 | 0.032 | 0.032 | 0.032 | 0.020 | 0.020 |
| Nozzle 3, inside diameter (inch) | 0.020 | 0.020 | 0.020 | 0.020 | 0.020 | 0.020 | 0.020 | 0.020 | 0.020 | 0.010 | 0.010 |
| Height 17 of gas cavity 5 (inch) | 0.400 | 0.600 | 0.800 | 1.000 | 1.000 | 0.800 | 0.800 | 0.800 | 0.800 | 0.600 | 0.800 |
| Total nozzle 3 length measured from base 10 (inch) | 0.608 | 0.808 | 1.008 | 1.208 | 1.208 | 1.116 | 1.106 | 1.008 | 1.008 | 0.808 | 1.008 |
| Diameter of gas hole 18 (inch) | 0.020 | 0.020 | 0.020 | 0.020 | 0.020 | 0.020 | 0.020 | 0.020 | 0.020 | 0.025 | 0.030 |
| Thickness of gas cover plate 18 (inch) | 0.032 | 0.032 | 0.032 | 0.032 | 0.032 | 0.032 | 0.032 | 0.032 | 0.032 | 0.032 | 0.032 |
| Thickness of spacer plate 13 (inch) | 0.032 | 0.032 | 0.032 | 0.032 | 0.032 | 0.020 | 0.010 | 0.032 | 0.032 | 0.032 | 0.032 |
| Thickness of gas cover plate 15 (inch) | 0.032 | 0.032 | 0.032 | 0.032 | 0.032 | 0.032 | 0.032 | 0.032 | 0.032 | 0.032 | 0.032 |
| Thickness of gas cover plate 16 (inch) | 0.032 | 0.032 | 0.032 | 0.032 | 0.032 | 0.032 | 0.032 | 0.032 | 0.032 | 0.032 | 0.032 |
| Diameter of gas hole 19 (inch) | 0.045 | 0.045 | 0.045 | 0.045 | 0.045 | 0.045 | 0.045 | 0.045 | 0.045 | 0.030 | 0.030 |
| Diameter of gas hole 20 (inch) | 0.055 | 0.055 | 0.055 | 0.055 | 0.055 | 0.055 | 0.055 | 0.055 | 0.055 | 0.045 | 0.045 |
| Nozzle spacing 23 (inch) | 0.080 | 0.080 | 0.080 | 0.080 | 0.080 | 0.080 | 0.080 | 0.060 | 0.045 | 0.062 | 0.054 |
| Nozzle spacing 24 (inch) | 0.080 | 0.080 | 0.080 | 0.080 | 0.080 | 0.080 | 0.080 | 0.060 | 0.045 | 0.054 | 0.062 |
| Number of nozzle 3 rows | 8 | 8 | 8 | 6 | 6 | 6 | 6 | 6 | 6 | 8 | 8 |
| Number of nozzles 3 per spinnerette | 500 | 500 | 500 | 375 | 375 | 375 | 375 | 375 | 375 | 440 | 480 |
| Spinnerette temperature (°F.) | 510 | 510 | 510 | 515 | 500 | 500 | 505 | 505 | 500 | 500 | 500 |
| Air temperatuer (°F.) in cavity 5 | 580 | 580 | 580 | 580 | 580 | 585 | 585 | 580 | 580 | 585 | 580 |
| Air pressure (psi) in cavity 5 | 27 | 27 | 27 | 27 | 27 | 28 | 27 | 27 | 28 | 27 | 27 |
| Baffle 9 in place = +; missing = −) | + | + | + | + | − | + | + | + | + | + | + |
| Nozzle 3 pattern; Figure: | 1 + 2 | 1 + 2 | 1 + 2 | 1 + 2 | 1 + 2 | 1 + 2 | 1 + 2 | 1 + 2 | 1 + 2 | 3 | 4 |
| Polymer throuput (gram/minute) | 400 | 400 | 400 | 300 | 300 | 300 | 300 | 300 | 300 | 150 | 170 |

In Example 5 the baffle 9 was removed, and spinning conditions were worse than in Example 1.

In Examples 6 and 7 the spacer thickness 13 was reduced from 0.032 to 0.020 and 0.010 inches, respectively, and droplet formation appeared in all 6 rows of nozzles 3, making very poor product, full of shot, in Example 7.

In Example 8 and 9 spinnerettes were equipped with a closer nozzle spacing 23 and 24, resulting in increasingly poorer spinning performance, especially in Example 9.

Examples 10 and 11 resulted in in excellent fiber formation of about 3 to 6 micrometers fiber diameter; here, smaller nozzles 3 were used in a hexagonal pattern of FIGS. 3 and 4.

In summarizing the invention, it is apparent from the examples that a number of features have to be incorporated into the spinnerette assembly to affect the improvements:

In order to obtain acceptable spinning performance in an assembly of more than four rows of nozzles 3, the air cavity 5 has to have a certain minimum height 17, and the nozzle spacing 23 and 24 can not be too close. The second air cavity 14 can not be too shallow or the fiber quality is poor. A further improvement is obtained by directing the air stream in the first air cavity 5 to the nozzle base 10.

While the invention has been described in connection with several exemplary embodiments thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed is:

1. An improved apparatus for producing melt blown fibers of the type wherein a fiberforming thermoplatsic polymer is formed into a fiber stream and wherein said fibers are collected on a receiver surface in the path of said fiber stream to form a non-woven mat, the improvement of which comprises:

a polymer feed chamber for receiving said molten polymer;

a plurality of nozzles means mounted in a spinnerette plate arranged in multiple rows for receiving said molten polymer from said polymer feed chamber and for forming fine melt blown fibers, and having:

a) a multiplicity of nozzles arranged in at least four rows;

b) a nozzle spacing at least 1.3 times the outside nozzle diameter;

c) a first gas cavity having a height of at least six times the outside diameter;

d) a first gas plate to receive said nozzles, said gas plate having the same hole pattern as the nozzle mounts and having gas holes intermittantly spaced between the nozzle holes through which the gas passes into a second gas cavity;

e) a second gas cavity formed by a spacer plate and a second gas plate;

f) said second gas cavity having a height of at least one half of said nozzle diameter;

g) said second gas plate having a hole pattern identical to said nozzle mounts and having and having holes which are larger than said outside nozzle diameter of said nozzles to pass gas from said second gas cavity around said nozzles at high velocity to form said fibers.

2. The apparatus of claim 1 wherein said first gas plate, said spacer plate and said second gas plate have a total combined thickness of less than ten times the outside diameter of said nozzles.

3. The apparatus of claim 1 wherein the second gas plate is formed by a multiplicity of plates having holes in a pattern identical to said nozzle mounts, and a hole diameter larger than the outside diameter of said nozzles.

4. The apparatus of claim 1 having a baffle means to direct gas streams to the nozzle bases at said nozzle mounts from a gas supply chamber.

5. A process for forming a non-woven mat of melt-blown fibers comprising: the steps of, a) introducing a molten polymer into a feed chamber for receiving said polymer, said feed chamber communicating with a multiplicity of extruding nozzles means mounted in a spinnerette plate and arranged in multiple rows said rows having at least four rows of at least four nozzles per row and said nozzles having a spacing of at least 1.3 times the outside nozzle diameter, b) extruding the molten polymer through the nozzles to form a fine filament, c) simultaneously introducing a gas stream into a first gas cavity said gas cavity being bounded on one side by said spinnerette plate and bounded on an opposite side by a first gas plate and said nozzles pass through said first gas chamber and said first gas plate and said first gas chamber has a height of at least six times the outside nozzle diameter, and said first gas plate defines a gas hole pattern wherein the hole pattern is the same as the nozzle mounts and the gas holes are intermittently spaced between the nozzle holes and said gas may pass from said first gas chamber to a second gas chamber through said gas holes, d) passing said gas through said gas holes into said second gas chamber, said second gas chamber being bounded on one side by said first gas plate and bounded on an opposite side by a second gas plate and said first gas plate and said second gas plate are spaced apart by a spacer plate and said second gas chamber has a height of at least one half of said nozzle diameter and said nozzles pass through said second chamber and said second gas plate defines a hole pattern identical to the nozzle pattern of said nozzle mounts and the holes of said hole pattern are larger than the outside diameter of said nozzles so that said gas can pass through said holes around said nozzles which pass through said holes in said second gas plate said gas is passed around said nozzles at high velocities so as to attenuate said fine filament exiting said extruder nozzles to form said fibers, and e) collecting said fibers on a receiver in the path of said fibers to form a non-woven mat.

* * * * *